US010600116B2

(12) United States Patent
Takatsuka et al.

(10) Patent No.: US 10,600,116 B2
(45) Date of Patent: Mar. 24, 2020

(54) RESERVATION MANAGEMENT DEVICE, RESERVATION MANAGEMENT SYSTEM, AND RESERVATION MANAGEMENT METHOD

(71) Applicant: OMRON CORPORATION, Kyoto-shi, Kyoto (JP)

(72) Inventors: Hiromasa Takatsuka, Tokyo (JP); Junichi Wada, Tokyo (JP); Kazuki Kasai, Tokyo (JP)

(73) Assignee: OMRON CORPORATION, Kyoto-shi (JP)

( * ) Notice: Subject to any disclaimer, the term of this patent is extended or adjusted under 35 U.S.C. 154(b) by 0 days.

(21) Appl. No.: 15/759,220

(22) PCT Filed: Nov. 2, 2016

(86) PCT No.: PCT/JP2016/082675
§ 371 (c)(1),
(2) Date: Mar. 11, 2018

(87) PCT Pub. No.: WO2017/086172
PCT Pub. Date: May 26, 2017

(65) Prior Publication Data
US 2018/0253787 A1    Sep. 6, 2018

(30) Foreign Application Priority Data

Nov. 17, 2015  (JP) .................................. 2015-224346

(51) Int. Cl.
*G05B 19/418*    (2006.01)
*G06Q 30/06*     (2012.01)
(Continued)

(52) U.S. Cl.
CPC .......... *G06Q 30/0645* (2013.01); *B60L 50/50* (2019.02); *B60L 53/665* (2019.02);
(Continued)

(58) Field of Classification Search
CPC ... Y02T 10/7005; Y02T 90/16; Y02T 90/124; Y02T 90/128; Y02T 90/163; Y02T 10/7088; Y02T 90/168
See application file for complete search history.

(56) References Cited

U.S. PATENT DOCUMENTS

RE30,939 E  *  5/1982  d'Alayer de Costemore
                       d'Arc ...................... G11B 15/43
                                                  242/334.4
4,411,008 A  * 10/1983  d'Alayer de Costemore
                       d'Arc ...................... G01B 7/042
                                                  360/137
(Continued)

FOREIGN PATENT DOCUMENTS

CN        1293149 A    5/2001
CN      103522994 A    1/2014
(Continued)

OTHER PUBLICATIONS

Eytchison, A method and a device for managing resources in a network, https://patents/google.com (Year: 1999).*
(Continued)

*Primary Examiner* — Darrin D Dunn
(74) *Attorney, Agent, or Firm* — Metrolex IP Law Group, PLLC

(57) ABSTRACT

A reservation management device (50) is a reservation management device configured to manage reservations for the exchange of battery packs (10) at a charging device (30) where battery packs (10) are exchanged, said reservation management device (50) comprising a reservation number acquisition component (53), a return number acquisition component (54), and a reservation possibility determination component (55). The reservation number acquisition component (53) is configured to acquire number of battery packs (10) to be reserved at the charging device (30). The return (Continued)

number acquisition component (54) is configured to acquire number of battery packs (10) to be returned to the charging device (30). The reservation possibility determination component (55) is configured to determine whether or not the exchange of the battery packs (10) can be reserved at the charging device (30) on the basis of reservation number acquired by the reservation number acquisition component (53) and return number acquired by the return number acquisition component (54).

13 Claims, 8 Drawing Sheets

(51) Int. Cl.
- G06Q 50/10 (2012.01)
- G06Q 10/02 (2012.01)
- B60L 53/80 (2019.01)
- B60L 50/50 (2019.01)
- B60L 53/66 (2019.01)
- B60S 5/06 (2019.01)
- G06Q 50/06 (2012.01)

(52) U.S. Cl.
CPC .............. B60L 53/80 (2019.02); B60S 5/06 (2013.01); G06Q 10/02 (2013.01); G06Q 50/06 (2013.01); G06Q 50/10 (2013.01); Y02T 90/124 (2013.01)

(56) References Cited

U.S. PATENT DOCUMENTS

| | | | | |
|---|---|---|---|---|
| 4,983,903 A * | 1/1991 | Bae | ........................... | B60K 1/04 320/128 |
| 5,048,353 A * | 9/1991 | Justus | ....................... | D21F 7/06 73/862.55 |
| 5,545,967 A * | 8/1996 | Osborne | .................... | B60S 5/06 320/109 |
| 5,563,809 A * | 10/1996 | Williams | ................. | G01N 9/24 700/122 |
| 5,612,606 A * | 3/1997 | Guimarin | ................. | B60K 1/04 320/109 |
| 5,623,194 A | 4/1997 | Boll et al. | | |
| 5,711,648 A * | 1/1998 | Hammerslag | ............ | B60K 1/04 414/800 |
| 6,036,137 A * | 3/2000 | Myren | .................... | B65H 18/10 242/534 |
| 6,325,321 B1 * | 12/2001 | Maurer | ................... | B65H 18/20 242/414.1 |
| 6,498,454 B1 * | 12/2002 | Pinlam | ................... | H01M 10/44 320/107 |
| 6,498,457 B1 * | 12/2002 | Tsuboi | .................... | B60L 50/64 320/110 |
| 7,002,265 B2 * | 2/2006 | Potega | ................... | G01R 31/36 307/149 |
| 8,484,060 B2 | 7/2013 | D'Andrea et al. | | |
| 8,634,879 B2 * | 1/2014 | Shi | ..................... | H04W 52/0248 455/572 |
| 8,698,642 B2 | 4/2014 | Taguchi | | |
| 8,751,077 B2 | 6/2014 | Hiruta et al. | | |
| 8,825,248 B2 | 9/2014 | Maki et al. | | |
| 8,838,318 B2 * | 9/2014 | Segawa | .................. | G01C 21/34 701/22 |
| 8,862,391 B2 * | 10/2014 | Park | ........................ | B60L 3/12 701/437 |
| 8,941,463 B2 * | 1/2015 | Rovik | ...................... | B60L 3/12 340/5.2 |
| 8,952,656 B2 | 2/2015 | Tse | | |
| 8,963,495 B2 * | 2/2015 | Park | ........................ | B60S 5/06 29/730 |
| 8,970,341 B2 * | 3/2015 | Park | ........................ | B60L 3/12 340/4.3 |
| 9,123,035 B2 * | 9/2015 | Penilla | ................... | G06Q 20/18 |
| 9,129,272 B2 * | 9/2015 | Penilla | ................... | G06Q 20/18 |
| 9,156,360 B2 * | 10/2015 | Park | ........................ | B60L 50/66 |
| 9,170,118 B2 * | 10/2015 | Kiyama | ............... | G01C 21/3469 |
| 9,172,254 B2 * | 10/2015 | Ganor | .................... | H02J 7/0011 |
| 9,177,305 B2 * | 11/2015 | Penilla | ................... | G06Q 20/18 |
| 9,177,306 B2 * | 11/2015 | Penilla | ................... | G06Q 20/18 |
| 9,193,277 B1 * | 11/2015 | Penilla | ................... | G06Q 20/18 |
| 9,248,752 B2 | 2/2016 | Kuribayashi et al. | | |
| 9,302,592 B2 * | 4/2016 | Lin | ........................ | B60L 53/305 |
| 9,321,357 B2 * | 4/2016 | Caldeira | ............. | B60L 11/1801 |
| 9,371,007 B1 | 6/2016 | Penilla et al. | | |
| 9,440,544 B2 * | 9/2016 | Lewis | ................. | B60L 11/1822 |
| 9,442,548 B1 * | 9/2016 | Johansson | ............ | G06F 1/3212 |
| 9,488,493 B2 | 11/2016 | MacNeille et al. | | |
| 9,496,736 B1 * | 11/2016 | Johansson | ............ | H02J 7/0054 |
| 9,597,973 B2 * | 3/2017 | Penilla | ................... | G06Q 20/18 |
| 9,623,762 B2 | 4/2017 | Park | | |
| 9,738,168 B2 * | 8/2017 | Penilla | ................... | G06Q 20/18 |
| 9,925,882 B2 * | 3/2018 | Penilla | ................... | G06Q 20/18 |
| 9,987,938 B2 * | 6/2018 | Salasoo | ............... | B60L 11/1822 |
| 10,084,329 B2 * | 9/2018 | Hamilton | ............. | H02J 7/0045 |
| 10,086,714 B2 * | 10/2018 | Penilla | ................... | G06Q 20/18 |
| 10,116,151 B2 * | 10/2018 | Seng | ...................... | H02J 7/0042 |
| 10,209,090 B2 * | 2/2019 | Luke | ...................... | B60L 1/003 |
| 10,245,964 B2 * | 4/2019 | Penilla | ................... | G06Q 20/18 |
| 10,286,801 B2 * | 5/2019 | Shimizu | .................. | H02J 3/00 |
| 2003/0069868 A1 * | 4/2003 | Vos | ........................ | G06Q 10/10 706/45 |
| 2003/0074134 A1 | 4/2003 | Shike et al. | | |
| 2003/0085621 A1 * | 5/2003 | Potega | ................... | G01R 31/36 307/18 |
| 2004/0113591 A1 | 6/2004 | Bradley et al. | | |
| 2004/0158544 A1 * | 8/2004 | Taekman | .............. | G06Q 10/00 706/45 |
| 2005/0035740 A1 * | 2/2005 | Elder | .................... | B60L 3/0046 320/116 |
| 2005/0035741 A1 * | 2/2005 | Elder | .................... | B60L 3/0046 320/116 |
| 2006/0181427 A1 * | 8/2006 | Bouse | ............... | G05B 19/4065 340/657 |
| 2007/0043665 A1 * | 2/2007 | Jemella | ................. | G06Q 20/10 705/40 |
| 2007/0176040 A1 * | 8/2007 | Asikainen | ............ | B65H 26/02 242/534 |
| 2008/0157722 A1 * | 7/2008 | Nobutaka | ............ | H01M 10/44 320/137 |
| 2009/0082957 A1 | 3/2009 | Agassi et al. | | |
| 2009/0088889 A1 * | 4/2009 | Hellstrom | ............. | B65H 26/02 700/127 |
| 2009/0243549 A1 | 10/2009 | Matsumura et al. | | |
| 2009/0315359 A1 | 12/2009 | Suzuki et al. | | |
| 2010/0071979 A1 * | 3/2010 | Heichal | ................. | B60K 1/04 180/68.5 |
| 2010/0100573 A1 * | 4/2010 | Harel | .................... | G06Q 10/08 707/812 |
| 2010/0105449 A1 * | 4/2010 | Shi | ..................... | H04W 52/0248 455/574 |
| 2010/0106401 A1 | 4/2010 | Naito et al. | | |
| 2010/0164439 A1 | 7/2010 | Ido | | |
| 2010/0230188 A1 * | 9/2010 | Nguyen | ................ | B60S 5/06 180/65.1 |
| 2010/0289451 A1 | 11/2010 | Tuffner et al. | | |
| 2011/0032110 A1 | 2/2011 | Taguchi | | |
| 2011/0128007 A1 | 6/2011 | Nishidai et al. | | |
| 2011/0156662 A1 * | 6/2011 | Nakamura | ............. | B60S 5/06 320/162 |
| 2011/0225105 A1 * | 9/2011 | Scholer | .................. | G06Q 50/06 705/412 |
| 2011/0257901 A1 * | 10/2011 | Bechhoefer | ............ | G01H 1/00 702/34 |
| 2011/0303509 A1 * | 12/2011 | Agassi | .................... | B60K 1/04 198/604 |
| 2012/0054076 A1 * | 3/2012 | Wu | ....................... | G06Q 10/087 705/28 |
| 2012/0098676 A1 | 4/2012 | Oizumi et al. | | |
| 2012/0109519 A1 | 5/2012 | Uyeki | | |

(56) References Cited

U.S. PATENT DOCUMENTS

| | | | |
|---|---|---|---|
| 2012/0112696 A1 | 5/2012 | Ikeda et al. | |
| 2012/0136594 A1* | 5/2012 | Tang | H01M 10/425 |
| | | | 702/63 |
| 2012/0229089 A1* | 9/2012 | Bemmel | H02J 7/0013 |
| | | | 320/109 |
| 2012/0242148 A1* | 9/2012 | Galati | H02J 3/14 |
| | | | 307/39 |
| 2012/0271723 A1* | 10/2012 | Penilla | G06Q 20/18 |
| | | | 705/16 |
| 2012/0306445 A1* | 12/2012 | Park | B60S 5/06 |
| | | | 320/109 |
| 2012/0326655 A1 | 12/2012 | Nomura | |
| 2013/0013139 A1 | 1/2013 | Maki et al. | |
| 2013/0030581 A1* | 1/2013 | Luke | B60L 1/003 |
| | | | 700/286 |
| 2013/0030608 A1* | 1/2013 | Taylor | B60L 1/003 |
| | | | 701/2 |
| 2013/0046457 A1 | 2/2013 | Pettersson | |
| 2013/0049677 A1* | 2/2013 | Bouman | B60L 1/003 |
| | | | 320/106 |
| 2013/0119920 A1 | 5/2013 | Hsu et al. | |
| 2013/0151293 A1* | 6/2013 | Karner | G06Q 20/102 |
| | | | 705/5 |
| 2013/0192060 A1* | 8/2013 | Park | B60L 3/12 |
| | | | 29/729 |
| 2013/0197803 A1* | 8/2013 | Park | B60L 3/12 |
| | | | 701/537 |
| 2013/0226441 A1* | 8/2013 | Horita | G01C 21/3469 |
| | | | 701/118 |
| 2013/0261953 A1 | 10/2013 | Kiyama et al. | |
| 2013/0282472 A1* | 10/2013 | Penilla | B60L 53/305 |
| | | | 705/14.35 |
| 2013/0317790 A1 | 11/2013 | Fukubayashi | |
| 2013/0335025 A1 | 12/2013 | Kuribayashi et al. | |
| 2013/0342310 A1* | 12/2013 | Park | B60L 3/12 |
| | | | 340/5.7 |
| 2013/0343842 A1* | 12/2013 | Yu | B65G 1/137 |
| | | | 414/273 |
| 2013/0345976 A1 | 12/2013 | Li et al. | |
| 2014/0002019 A1 | 1/2014 | Park et al. | |
| 2014/0046595 A1* | 2/2014 | Segawa | G01C 21/34 |
| | | | 701/541 |
| 2014/0100689 A1* | 4/2014 | Yu | B65G 1/137 |
| | | | 700/218 |
| 2014/0116124 A1* | 5/2014 | Ma | G05B 23/0232 |
| | | | 73/112.01 |
| 2014/0125281 A1 | 5/2014 | Mitsutani | |
| 2014/0148965 A1* | 5/2014 | Epstein | B60L 53/53 |
| | | | 700/297 |
| 2014/0163877 A1* | 6/2014 | Kiyama | G01C 21/3469 |
| | | | 701/533 |
| 2014/0172282 A1* | 6/2014 | Feng | B60L 58/12 |
| | | | 701/117 |
| 2014/0232340 A1* | 8/2014 | Jones | G06Q 10/06 |
| | | | 320/109 |
| 2014/0257884 A1* | 9/2014 | Kyoung | G06Q 10/02 |
| | | | 705/5 |
| 2014/0266004 A1 | 9/2014 | Andrews, Jr. | |
| 2014/0371969 A1 | 12/2014 | Asai et al. | |
| 2015/0012212 A1* | 1/2015 | Park | B60L 3/12 |
| | | | 701/431 |
| 2015/0024240 A1* | 1/2015 | Seubert | H02J 7/0065 |
| | | | 429/50 |
| 2015/0039391 A1 | 2/2015 | Hershkovitz et al. | |
| 2015/0123611 A1* | 5/2015 | Huang | B60L 53/80 |
| | | | 320/109 |
| 2015/0127479 A1* | 5/2015 | Penilla | G06Q 20/18 |
| | | | 705/26.1 |
| 2015/0134142 A1* | 5/2015 | Taylor | G07C 5/00 |
| | | | 701/1 |
| 2015/0134467 A1* | 5/2015 | Penilla | G06Q 20/18 |
| | | | 705/16 |
| 2015/0134546 A1* | 5/2015 | Penilla | G06Q 20/18 |
| | | | 705/305 |
| 2015/0149015 A1* | 5/2015 | Nakano | B60L 11/1861 |
| | | | 701/22 |
| 2015/0158393 A1* | 6/2015 | Kawano | B60L 53/65 |
| | | | 320/109 |
| 2015/0185721 A1 | 7/2015 | Deilmann et al. | |
| 2015/0202975 A1* | 7/2015 | Solomon | G06Q 10/06316 |
| | | | 705/7.26 |
| 2015/0241233 A1 | 8/2015 | Loftus et al. | |
| 2015/0256003 A1* | 9/2015 | Yonetani | B60L 53/68 |
| | | | 320/150 |
| 2015/0280465 A1* | 10/2015 | Lin | H02J 7/007 |
| | | | 320/137 |
| 2015/0283912 A1 | 10/2015 | Shimizu et al. | |
| 2015/0286965 A1* | 10/2015 | Amano | G01C 21/3469 |
| | | | 705/5 |
| 2015/0298565 A1 | 10/2015 | Iwamura et al. | |
| 2015/0298567 A1* | 10/2015 | Uyeki | B60L 11/1848 |
| | | | 320/155 |
| 2015/0321570 A1 | 11/2015 | Cun | |
| 2015/0321571 A1* | 11/2015 | Penilla | G06Q 20/18 |
| | | | 320/104 |
| 2015/0357837 A1* | 12/2015 | Takai | H01M 10/44 |
| | | | 320/107 |
| 2015/0363749 A1* | 12/2015 | Buscher | G06Q 10/20 |
| | | | 705/305 |
| 2015/0367743 A1* | 12/2015 | Lin | B60L 53/305 |
| | | | 320/109 |
| 2015/0380936 A1* | 12/2015 | Frolik | H02J 3/14 |
| | | | 307/112 |
| 2016/0009192 A1 | 1/2016 | Zhang et al. | |
| 2016/0016481 A1 | 1/2016 | Maya et al. | |
| 2016/0025506 A1* | 1/2016 | Penilla | G06Q 20/18 |
| | | | 701/430 |
| 2016/0039296 A1 | 2/2016 | Nakamura et al. | |
| 2016/0039299 A1* | 2/2016 | Nguyen | B60L 11/1822 |
| | | | 320/109 |
| 2016/0071079 A1* | 3/2016 | Aloe | H02J 7/0003 |
| | | | 705/17 |
| 2016/0071138 A1* | 3/2016 | Hill | G06Q 30/0208 |
| | | | 705/14.11 |
| 2016/0099590 A1* | 4/2016 | Velderman | H02J 7/0027 |
| | | | 320/113 |
| 2016/0117759 A1* | 4/2016 | Penilla | B60L 53/305 |
| | | | 705/26.9 |
| 2016/0159240 A1 | 6/2016 | Tseng et al. | |
| 2016/0176307 A1* | 6/2016 | Becker | B60L 11/1846 |
| | | | 320/109 |
| 2016/0185246 A1 | 6/2016 | Paul | |
| 2016/0272078 A1 | 9/2016 | Kalyanaraman et al. | |
| 2016/0273927 A1 | 9/2016 | Kitajima et al. | |
| 2016/0303990 A1* | 10/2016 | Penilla | G06Q 20/18 |
| 2016/0343068 A1 | 11/2016 | Barrois et al. | |
| 2016/0364776 A1* | 12/2016 | Khoo | G06F 1/26 |
| 2016/0368464 A1* | 12/2016 | Hassounah | B60S 5/06 |
| 2016/0380440 A1* | 12/2016 | Coleman, Jr. | G05F 1/66 |
| | | | 700/295 |
| 2017/0036560 A1 | 2/2017 | Schuelke et al. | |
| 2017/0043671 A1* | 2/2017 | Campbell | G01C 21/34 |
| 2017/0074677 A1* | 3/2017 | MacNeille | G01C 21/3697 |
| 2017/0084155 A1 | 3/2017 | Mese et al. | |
| 2017/0085103 A1* | 3/2017 | Seng | H02J 7/0042 |
| 2017/0091890 A1 | 3/2017 | Hirose et al. | |
| 2017/0097652 A1* | 4/2017 | Luke | H02J 7/00 |
| 2017/0098176 A1 | 4/2017 | Hirose et al. | |
| 2017/0102695 A1* | 4/2017 | Hilemon | G05B 23/0264 |
| 2017/0136894 A1* | 5/2017 | Ricci | H02J 7/025 |
| 2017/0176195 A1 | 6/2017 | Rajagopalan et al. | |
| 2017/0190259 A1* | 7/2017 | Penilla | G06Q 20/18 |
| 2018/0012197 A1* | 1/2018 | Ricci | H04L 9/321 |
| 2018/0015835 A1* | 1/2018 | Penilla | G06Q 20/18 |
| 2018/0032920 A1* | 2/2018 | Ito | G06Q 10/04 |
| 2018/0041053 A1* | 2/2018 | Capizzo | H02J 7/0027 |
| 2018/0143029 A1 | 5/2018 | Nikulin et al. | |
| 2018/0154789 A1* | 6/2018 | Janku | B60S 5/06 |
| 2018/0202825 A1 | 7/2018 | You et al. | |

(56) References Cited

U.S. PATENT DOCUMENTS

| | | |
|---|---|---|
| 2018/0205257 A1 | 7/2018 | Kwon et al. |
| 2018/0208069 A1* | 7/2018 | Lin .................... B60L 11/1822 |
| 2018/0241234 A1* | 8/2018 | Liang .................... H02J 7/0047 |
| 2018/0244167 A1* | 8/2018 | Penilla .................... G06Q 20/18 |
| 2018/0253788 A1* | 9/2018 | Takatsuka ............... B60L 58/12 |
| 2018/0253789 A1* | 9/2018 | Takatsuka ................ B60S 5/06 |
| 2018/0253928 A1* | 9/2018 | Assadsangabi ........ G06Q 20/18 |
| 2018/0272878 A1 | 9/2018 | Lee |
| 2018/0312072 A1 | 11/2018 | Yang et al. |
| 2019/0006862 A1* | 1/2019 | Hamilton, IV ....... H02J 7/0045 |
| 2019/0009683 A1 | 1/2019 | Saito et al. |
| 2019/0011926 A1 | 1/2019 | Konishi et al. |
| 2019/0031037 A1 | 1/2019 | Fendt |
| 2019/0047434 A1 | 2/2019 | Oh et al. |
| 2019/0061541 A1* | 2/2019 | Penilla .................. G06Q 20/18 |
| 2019/0156407 A1* | 5/2019 | Igata ................. G06Q 30/0284 |
| 2019/0157881 A1* | 5/2019 | Velderman ............ H02J 7/0027 |
| 2019/0197608 A1* | 6/2019 | Iwai ..................... G01R 31/382 |

FOREIGN PATENT DOCUMENTS

| | | |
|---|---|---|
| CN | 104583719 A | 4/2015 |
| CN | 104779680 A | 7/2015 |
| EP | 2578997 A1 | 4/2013 |
| EP | 3090905 A1 | 11/2016 |
| JP | 2000-341868 A | 12/2000 |
| JP | 2003-262525 A | 9/2003 |
| JP | 2006-331405 A | 12/2006 |
| JP | 2007-116799 A | 5/2007 |
| JP | 2008009492 A | 1/2008 |
| JP | 2010-4666 A | 1/2010 |
| JP | 2010-107203 A | 5/2010 |
| JP | 2010-142026 A | 6/2010 |
| JP | 2010-230615 A | 10/2010 |
| JP | 2010-540907 A | 12/2010 |
| JP | 2011-83166 A | 4/2011 |
| JP | 2011-197932 A | 10/2011 |
| JP | 2011-253727 A | 12/2011 |
| JP | 2012-145499 A | 8/2012 |
| JP | 2012-211903 A | 11/2012 |
| JP | 2013-15933 A | 1/2013 |
| JP | 5362930 B1 | 12/2013 |
| JP | 2014-3803 A | 1/2014 |
| JP | 2014-524618 A | 9/2014 |
| JP | 2014-219749 A | 11/2014 |
| JP | 2014-225167 A | 12/2014 |
| JP | 2015-15875 A | 1/2015 |
| JP | 2015191425 A | 11/2015 |
| TW | 201321230 A1 | 6/2013 |
| TW | 201337805 A | 9/2013 |
| TW | 1413015 B | 10/2013 |
| WO | 2013024484 A1 | 2/2013 |
| WO | 2013080211 A1 | 6/2013 |
| WO | 2015001930 A1 | 1/2015 |
| WO | 2017/086161 A1 | 5/2017 |
| WO | 2017/086173 A1 | 5/2017 |
| WO | 2017/086174 A1 | 5/2017 |

OTHER PUBLICATIONS

Taiwanese Office Action (TWOA) dated Feb. 21, 2018 in a related Taiwanese patent application.
Extended European search report (EESR) dated Dec. 3, 2018 in a related European patent application.
English translation of the International Search Report of a related international application PCT/JP2016/082565 dated Dec. 27, 2016.
English translation of the Written Opinion of a related international application PCT/JP2016/082565 dated Dec. 27, 2016.
English translation of the International Search Report of PCT/JP2016/082675 dated Jan. 10, 2017.
English translation of the Written Opinion of PCT/JP2016/082675 dated Jan. 10, 2017.
English translation of the International Search Report of a related international application PCT/JP2016/082676 dated Jan. 24, 2017.
English translation of the Written Opinion of a related international application PCT/JP2016/082676 dated Jan. 24, 2017.
English translation of the International Search Report of a related international application PCT/JP2016/082677 dated Jan. 31, 2017.
English translation of the Written Opinion of a related international application PCT/JP2016/082677 dated Jan. 31, 2017.
Taiwanese Office Action of a related Taiwanese application 105136769 dated Jan. 22, 2018.
Extended European search report (EESR) dated Nov. 14, 2018 in a related European patent application.
Extended European search report (EESR) dated Nov. 15, 2018 in a related European patent application.
Japanese Office Action dated Jun. 25, 2019 in a related Japanese patent application.
Taiwanese Office Action of a counterpart Taiwanese application 105136976 dated Feb. 12, 2018.
U.S. Office Action dated May 16, 2019 in a related U.S. Appl. No. 15/759,226.
U.S. Office Action dated Aug. 7, 2019 in a related U.S. Appl. No. 15/759,223.
U.S. Office Action dated Aug. 7, 2019 in a related U.S. Appl. No. 15/759,221.
U.S. Office Action dated Nov. 15, 2019 in a related U.S. Appl. No. 15/759,226.
U.S. Office Action dated Nov. 29, 2019 in a related U.S. Appl. No. 15/759,223.
U.S. Office Action dated Nov. 29, 2019 in a related U.S. Appl. No. 15/759,221.

* cited by examiner

RESERVATION MANAGEMENT DEVICE, RESERVATION MANAGEMENT SYSTEM, AND RESERVATION MANAGEMENT METHOD

FIELD

The present invention relates to a reservation management device, a reservation management system, and a reservation management method for managing reservations of battery exchange at a charging device.

BACKGROUND ART

Recent years have seen systems constructed in which battery packs installed in a vehicle such as an electric motorcycle, an electric bicycle, or an electrically assisted bicycle are used and then exchanged at a charging device where charged batteries are available.

For example, Patent Literature 1 discloses a rechargeable battery supply system in which, in order to exchange a secondary battery that has been discharged in an electric vehicle, various kinds of information such whether or not supply is possible in a secondary battery supply system, the number of batteries that can be supplied, and the supply price are acquired, and charging facility information is displayed on a display component.

CITATION LIST

Patent Literature

Patent Literature 1: JP-A 2010-4666

SUMMARY

However, with the secondary battery supply system shown in Patent Literature 1, the number of secondary batteries to be returned is not taken into consideration, and the following problems may occur.

For example, in one possible configuration of a charging device with which secondary batteries are exchanged, a plurality of secondary batteries intended for exchange are inserted into individual rechargeable battery holes. When a battery swap is performed at such a charging device, if there are not enough empty rechargeable battery holes for returning batteries, then a user may show up at the charging facility or the station and not be able to return his batteries.

It is an object of the present invention to provide a reservation management device, a reservation management system, and a reservation management method with which reservations can be managed so as to take into account the number of batteries to be returned.

Solution to Problem

The reservation management device pertaining to the first invention is a reservation management device that manages reservations for the exchange of batteries in a charging device capable of charging a plurality of batteries, said reservation management device comprising a reservation number acquisition component, a return number acquisition component, and a reservation possibility determination component. The reservation number acquisition component acquires the number of batteries to be reserved at the charging device. The return number acquisition component acquires the number of batteries to be returned to the charging device. The reservation possibility determination component determines whether or not the exchange of the battery packs in the charging device can be reserved on the basis of the number of reservations acquired by the reservation number acquisition component and the number of returns acquired by the returned number acquisition component.

Thus, reservations can be managed in consideration of the number of batteries to be returned, by determining whether or not reservation is possible on the basis of the number of batteries to be returned to the charging device and the number to be reserved.

In other words, it is possible to prevent a situation in which a battery cannot be returned or the reserved number of batteries cannot be picked up even though a user has arrived at the charging device.

The reservation management device pertaining to the second invention is the reservation management device pertaining to the first invention, wherein the charging device is provided with a plurality of battery disposition components for disposing batteries. The reservation possibility determination component determines whether or not it is possible to reserve a battery exchange on the basis of the number of empty battery disposition components in addition to the number of reservations and the number of returns.

Thus, when there are battery disposition components for disposing individual batteries, it can be determined whether or not all of the batteries to be returned can in fact be returned to the charging device by taking into account the number of empty battery disposition components.

The reservation management device pertaining to the third invention is the reservation management device pertaining to the first or second invention, wherein the charging device is provided with a plurality of battery disposition components for disposing the batteries, and the reservation possibility determination component determines whether or not the number of returns allows a battery to be returned to the charging device on the basis of the number of empty battery disposition components in addition to the number of reservations and the number of returns, and determines the reservation is possible when return is possible. Thus enabling the reservations when returns are possible allows batteries to be reliably returned to the battery disposing components upon their arrival at the charging device, and prevents situations in which a battery cannot be returned.

The reservation management device pertaining to the fourth invention is the reservation management device pertaining to any of the first to third inventions, wherein the to charging device is provided with a plurality of battery disposition components for disposing batteries, and the reservation management device further comprises a charged battery number acquisition component. The charged battery number acquisition component acquires the number of charged batteries in the charging device. The reservation possibility determination component determines whether or not reservation is possible on the basis of the number of charged batteries, the number of reservations, the number of returns, and the number of empty battery disposition components.

Thus, by comparing the number of charged batteries with the number of reservations, it is possible to allow reservations when the number of charged batteries is equal to or greater than the number of reservations, for example. Consequently, when a user arrives at the charging device, he can reliably pick up charged batteries, and a situation in which batteries cannot be picked up can be prevented.

The reservation management device pertaining to the fifth invention is the reservation management device pertaining to the fourth invention, wherein the charged battery number acquisition component acquires the number of charged batteries by sensing batteries whose charge is greater than or equal to a specific amount, and counting the number of said batteries.

Consequently, the user can acquire the number of charged batteries he has reserved at the charging device.

The reservation management device pertaining to the sixth invention is the reservation management device pertaining to the fourth invention, wherein the charged battery number acquisition component acquires the number of charged batteries by sensing batteries that are fully charged, and counting the number of said batteries.

Consequently, the user can acquire the number of fully charged batteries he has reserved at the charging device.

The reservation management device pertaining to the seventh invention is the reservation management device pertaining to the fourth invention, further comprising a charge-at-exchange calculator. The charge-at-exchange calculator calculates the charge of the batteries in the charging device at the scheduled exchange time. The charged battery number acquisition component acquires the number of charged batteries by sensing batteries whose charge at the scheduled exchange time is greater than or equal to a specific amount, and counting the number of said batteries.

Consequently, the user can acquire the number of fully charged batteries he has reserved at the charging device.

The reservation management device pertaining to the eighth invention is the reservation management device pertaining to the third invention, wherein the reservation possibility determination component determines that return is possible when the number of empty battery disposition components is greater than or equal to the number of returns.

Consequently, when it is determined that reservation is possible, the number of batteries scheduled to be returned can in fact be returned to the charging device upon arrival at the charging device.

For example, if a charged battery cannot be taken out of its battery disposition component unless all of the batteries to be returned to the battery charger are disposed in the battery disposition components, the number of empty battery disposition components needs to be greater than or equal to the number of returns. In such a case, when it has been determined that reservation is possible, the number of batteries scheduled to be returned can be reliably returned to the charging device upon arrival at the charging device.

The reservation management device pertaining to the ninth invention is the reservation management device pertaining to the third invention, wherein the reservation possibility determination component determines that return is possible when the number of empty battery disposition components is greater than the remainder of subtracting the number of reservations from the number of returns.

Consequently, when the number of returns is greater than the number of reservations, the number of batteries scheduled to be returned can in fact be returned to the charging device upon arrival at the charging device.

The reservation management device pertaining to the tenth invention is the reservation management device pertaining to the first invention, wherein the batteries can be removably installed in a power consumption element, and the power consumption element is an electric motorcycle, an electric bicycle, an electrically assisted bicycle, or an electric power tool.

Consequently, it is possible to reserve a battery exchange in order to exchange a battery installed in a power consumption element at the charging device.

The reservation management device pertaining to the eleventh invention is the reservation management device pertaining to the first invention, wherein the battery can be removably installed in a moving body, and a plurality of the batteries are connected in parallel in a state of being installed in the moving body.

Since the configuration thus allows batteries that can be installed in a moving body to be connected in parallel, the user can install in the moving body a number of batteries corresponding to the distance to be traveled. That is, fewer batteries may be installed when the scheduled travel distance is short, and a smaller number of installed batteries means that the weight is lighter and the travel distance for a given amount of power amount can be extended. In this case, the number of batteries returned may be greater than the number of reservations, but with the above invention, even when the number of returns is large, this can be taken into account in determining whether reservations are possible.

Also, a vehicle such as an electric motorcycle, an electric bicycle, or an electrically assisted bicycle is used as the moving body.

Consequently, battery exchange reservations can be made in order to exchange batteries installed in a moving body at the charging device.

The reservation management system pertaining to the twelfth invention is a reservation management system that manages reservations for the exchange of batteries in a charging device capable of charging a plurality of batteries, said reservation management system comprising a reservation number acquisition component, a return number acquisition component, a reservation possibility determination component, a reservation number input component, a return number input component, an information transmitter, and a display component. The reservation number acquisition component that acquires the number of to batteries to be reserved at the charging device. The return number acquisition component acquires the number of batteries to be returned to the charging device. The reservation possibility determination component determines whether or not the exchange of the battery packs in the charging device can be reserved on the basis of the number of reservations acquired by the reservation number acquisition component and the number of returns acquired by the returned number acquisition component. The reservation number input component is used to input the number of reservations. The return number input component is used to input the number of returns. The information transmitter transmits the inputted number of reservations to the reservation number acquisition component and transmits the inputted number of returns to the return number acquisition component. The display component displays information related to the reservation possibility determined by the reservation possibility determination component.

Consequently, when the user inputs the number of reservations and the number of returns from an information terminal, it is determined whether or not reservation is possible on the basis of this input, and the user can confirm whether or not a battery exchange at the charging device can be reserved.

The reservation management system pertaining to the thirteenth invention is the reservation management system pertaining to the twelfth invention, wherein, when it is determined by the reservation possibility determination component that the exchange of batteries at a specific charging device cannot be reserved, the display component displays a message to the effect that the exchange of batteries cannot be reserved at the specific charging device.

Consequently, the user can recognize that battery exchange cannot be reserved at a specific charging device.

The reservation management system pertaining to the fourteenth invention is the reservation management system pertaining to the twelfth invention, wherein a plurality of charging devices are provided. The reservation management system manages reservations for the exchange of batteries at the plurality of charging devices. When it is determined by the reservation possibility determination component that the exchange of batteries at the specific charging device cannot be reserved, information related to other charging devices that can be reserved is displayed on the display component.

Consequently, when it is determined that a reservation cannot be made at a specific charging device, the user can check information related to other charging devices that can be reserved. For example, navigation to another charging device can be displayed on the display component, making it easy for the user to arrive at another charging device, thereby making the device more user friendly.

The reservation management system pertaining to the fifteenth invention is the reservation management system pertaining to the twelfth invention, further comprising a charged battery number acquisition component. The charged battery number acquisition component acquires the number of charged batteries at a charging device. The charging device is provided with a plurality of battery disposition components for disposing batteries. The reservation possibility determination component determines whether or not the exchange of the battery packs in the charging device can be reserved on the basis of the number of charged batteries, the number of reservations, the number of returns, and the number of empty battery disposition components. The display component displays the number of batteries that can be returned or the number of batteries that can be reserved at the specific charging device when it is determined that battery exchange cannot be reserved at the specific charging device.

Consequently, when the user cannot return or reserve the desired number of batteries, the number of items that can be returned or the number that can be reserved can be presented to the user. Therefore, the user can determine whether or not to head toward a charging device after checking the presented number of batteries that can be returned or the number that can be reserved.

The reservation management system pertaining to the sixteenth invention is the reservation management system pertaining to the twelfth invention, further comprising a waiting time calculator. The waiting time calculator calculates the waiting time at a specific charging device when it is determined by the reservation possibility determination component that exchange of the batteries at the specific charging device cannot be reserved. The display component displays the waiting time at the specific charging device.

Consequently, when the user cannot return or reserve the desired number of batteries, how long it will take until the desired number of batteries can be returned or reserved can be presented to the user. Therefore, the user can determine whether or not to head toward a charging device after checking the presented waiting time.

The reservation management method pertaining to the seventeenth invention is a reservation management method for managing reservations for battery exchange at a charging device capable of charging a plurality of batteries, said method comprising a reservation number acquisition step, a return number acquisition step, and a reservation possibility determination step. The reservation number acquisition step involves acquiring the number of batteries to be reserved in the charging device. The return number acquisition step involves acquiring the number of the batteries to be returned to the charging device. The reservation possibility determination step involves determining whether or not it is possible to exchange the batteries at the charging device on the basis of the number of reservations acquired in the reservation number acquisition step and the number of returns acquired in the returned number acquisition step.

Thus, reservations can be managed in consideration of the number of batteries to be returned by determining whether or not reservations are possible on the basis of the number of batteries to be returned to the charging device and the number to be reserved.

In other words, it is possible to prevent a situation in which a battery cannot be returned or the reserved number of batteries cannot be picked up even though a user has arrived at the charging device.

Effects

The reservation management device, reservation management system, and reservation management method of the present invention make it possible to manage reservations by taking into account the number of batteries to be returned.

DETAILED DESCRIPTION

Figure 1:
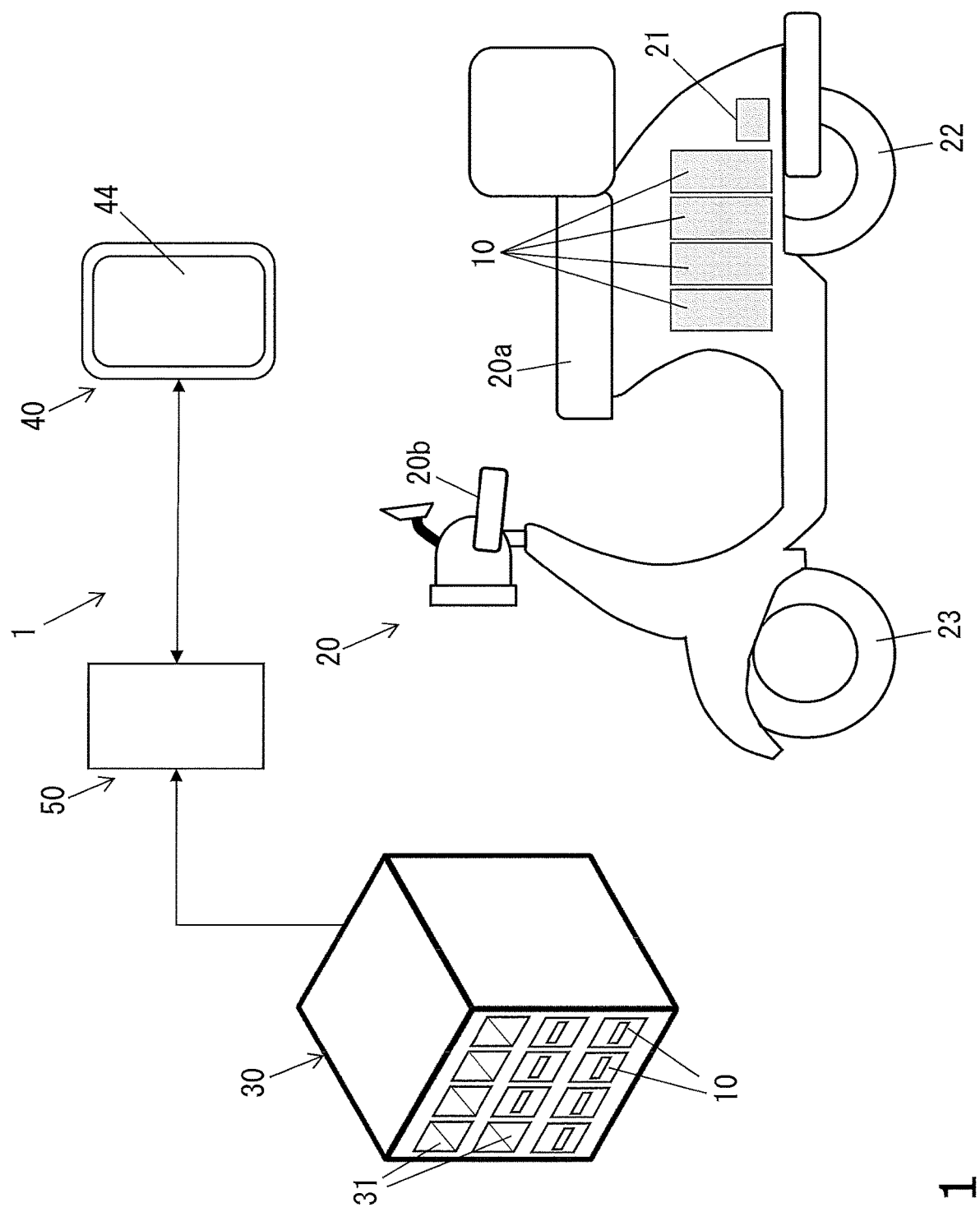
FIG. 1 is a diagram showing a reservation management system in an embodiment of the present invention.

The reservation management device, reservation management system, and reservation management method pertaining to an embodiment of the present invention will now be described through reference to the drawings.

Embodiments

1. Configuration 1-1. Overview of Reservation Management System

A reservation management system 1 in this embodiment manages reservations for battery exchange in order to exchange battery packs 10 installed in a vehicle 20 at a charging device 30.

The vehicle 20 is propelled when supplied with power from four battery packs 10 installed in a space below a seat 20a to a motor 21, and the rear wheel (drive wheel) 22 is rotationally driven. The front wheel 23 is a steered wheel provided between the front part of the vehicle 20 and the road surface, and the travel direction can be varied by changing the orientation in conjunction with the orientation of a handle bar 20b.

The vehicle 20 can make use of a so-called battery swap, in which the battery packs 10 whose remaining capacity has been reduced by travel, natural discharge, or the like are exchanged for charged battery packs 10 at a specific charging device 30.

In order to supply power to the vehicle 20, four of the battery packs 10 are installed in the vehicle 20 in a manner that allows them to be replaced. The four battery packs 10 are connected in parallel to the vehicle 20. Therefore, even when only one of the four battery packs 10 is installed in the vehicle 20, power can be supplied to the motor 21 and the vehicle 20 can travel.

The reservation management system 1 for making reservations to exchange the battery packs 10 at the charging device 30 comprises an information terminal 40 and a reservation management device 50.

The user of the vehicle 20 uses the information terminal 40 to input information related to a reservation. In FIG. 1, the information terminal 40 is provided separately from the vehicle 20, but it may be incorporated into the vehicle 20. The reservation management device 50 manages reservations for exchanging the battery packs 10 at the charging device 30.

The charging device 30 charges the battery packs 10.

1-2. Charging Device 30

The charging device 30 has a plurality of rechargeable battery holes 31 into which the battery packs 10 are inserted. The battery packs 10 are accommodated in the rechargeable battery holes 31. The battery packs 10 are charged while housed in these rechargeable battery holes 31.

Figure 2:
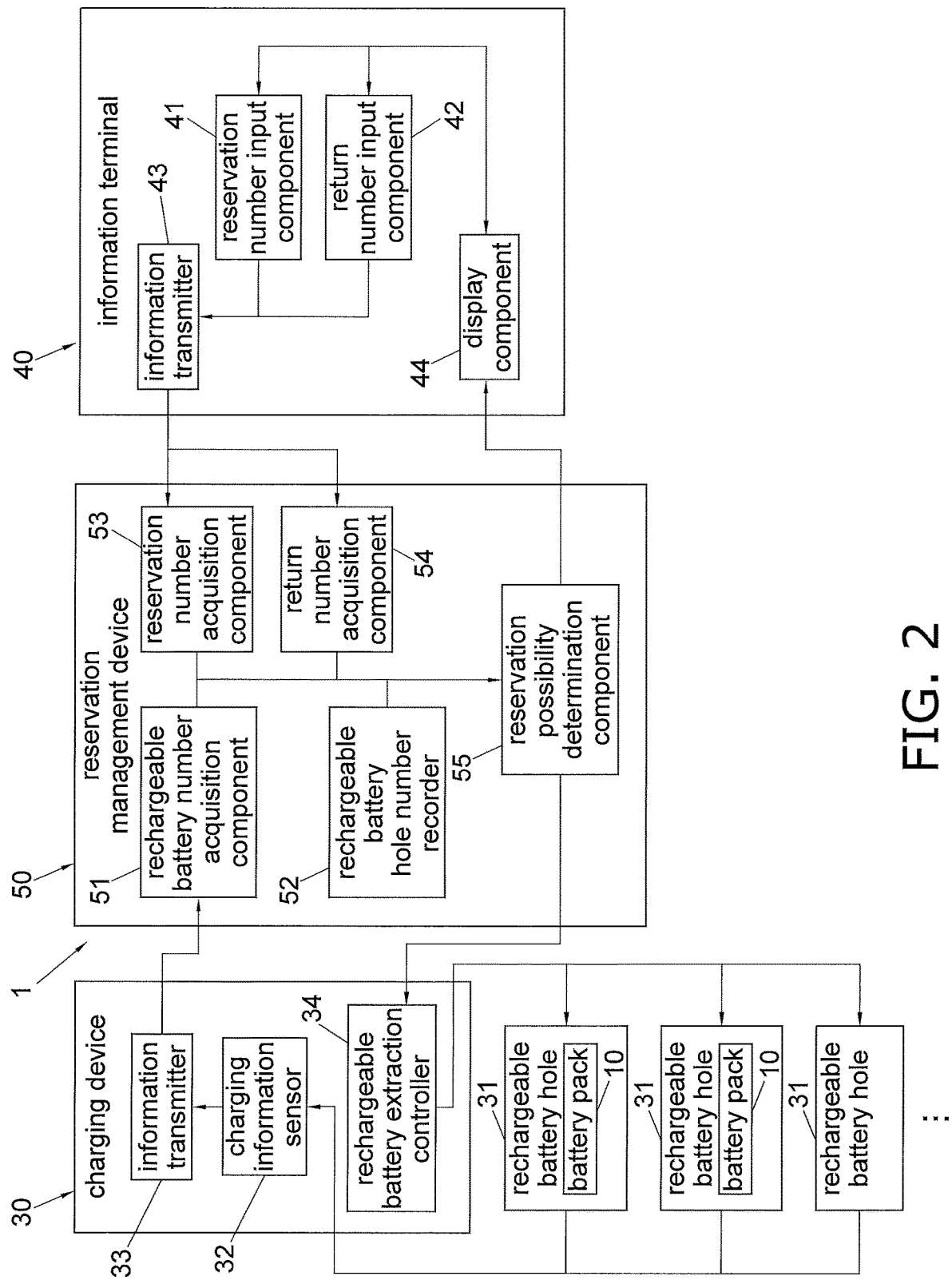
FIG. 2 is a block diagram showing the configuration of the reservation management system in FIG. 1.

As shown in FIG. 2, the charging device 30 further includes a charging information sensor 32, an information transmitter 33, and a rechargeable battery extraction controller 34.

The charging information sensor 32 senses information related to the charging of the battery packs 10 disposed in the rechargeable battery holes 31. Information related to charging includes information about the number of battery packs 10 inserted in the rechargeable battery holes 31, and information about the number of battery packs 10 that have been charged. The information transmitter 33 transmits this information to the reservation management device 50.

The rechargeable battery extraction controller 34 controls the insertion and removal of the battery packs 10 into and from the rechargeable battery holes 31 on the basis of the number of returns and the number of reservations received from a reservation possibility determination component 55 (discussed below) of the reservation management device 50. More specifically, in this embodiment, the rechargeable battery extraction controller 34 allows the reserved number of battery packs 10 to be taken out after recognizing that battery packs 10 equal to the received number of returns have been inserted into the empty rechargeable battery holes 31. For example, if the number of returns is 3 and the number of reservations is 2, the rechargeable battery extraction controller 34 allows the reserved number of battery packs 10 to be taken out after recognizing that three battery packs (the returned number) have been inserted into the rechargeable battery holes 31. The configuration may be such that other battery packs 10 are locked until battery packs 10 equal to the number of returns have been inserted into the rechargeable battery holes 31.

1-3. Information Terminal 40

The information terminal 40 is, for example, a smartphone, and has a reservation number input component 41, a return number input component 42, an information transmitter 43, and a display component 44.

Figure 3:
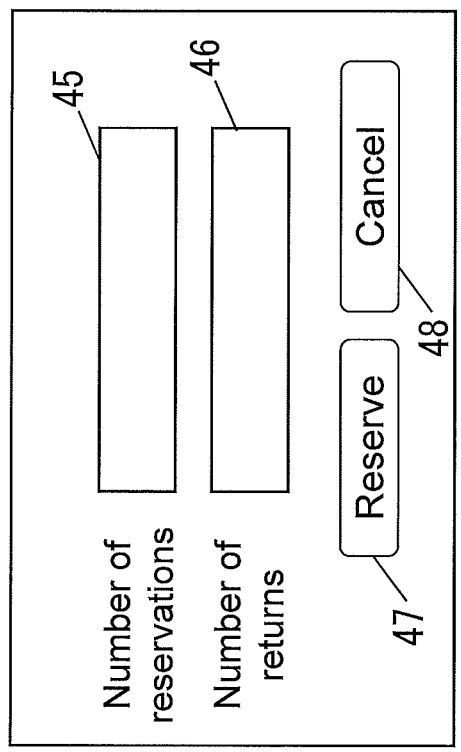
FIG. 3 is a diagram showing an example of a reservation screen in the reservation management system in FIG. 2.

The reservation number input component 41 inputs the number of battery packs 10 to be reserved in the charging device 30 by the user. More specifically, as shown in FIG. 3, the reservation number input component 41 causes the display component 44 to display a reservation number input field 45 for inputting the number of reservations, and the user inputs the number of reservations in the reservation number input field 45.

The return number input component 42 inputs the number of battery packs 10 returned by the user to the charging device 30. More specifically, as shown in FIG. 3, the return number input component 42 causes the display component 44 to display a return number input field 46 for inputting the number of returns, and the user inputs the number of returns in the return number input field 46.

Here, as mentioned above, the configuration is such that battery packs 10 that can be installed in the vehicle 20 can be connected in parallel, so the user can install the battery packs 10 in the vehicle 20 according to the distance to be traveled. That is, fewer batteries may be installed when the scheduled travel distance is short, and a smaller number of installed batteries means that the weight is lighter and the travel distance for a given amount of power amount can be extended. In this case, the number of battery packs 10 returned may be greater than the number of reservations. Conversely, if the scheduled travel distance is long, the number of battery packs 10 returned may be smaller than the number of reservations.

Thus, when the vehicle 20 in this embodiment is used and the battery packs 10 are exchanged at the charging device 30, the number of reservations and the number of returns for the battery packs 10 may sometimes be different.

The information transmitter 43 transmits to the reservation management device 50 the number of reserved battery packs 10 inputted to the reservation number input component 41 and the number of returned battery packs 10 inputted to the return number input component 42.

The display component 44 displays the above-mentioned reservation number input field 45 and the return number input field 46. As shown in FIG. 3, a reserve button 47 and a cancel button 48 are displayed below the reservation number input field 45 and the return number input field 46. When the reserve button 47 is operated, the inputted number of reservations and number of returns for the battery packs 10 are transmitted to the reservation management device 50.

Also, the display component 44 displays whether or not the reservation is possible, as determined by the reservation management device 50.

1-4. Reservation Management Device 50

The reservation management device 50 manages reservations for the exchange of battery packs 10 at the charging device 30. The reservation management device 50 may be attached to the charging device 30, or may be provided independently as a server or the like.

The reservation management device 50 includes a rechargeable battery number acquisition component 51, a rechargeable battery hole number recorder 52, a reservation number acquisition component 53, a return number acquisition component 54, and a reservation possibility determination component 55.

The rechargeable battery number acquisition component 51 acquires information related to charging transmitted from the information transmitter 33 of the charging device 30. Information related to charging includes information about the number of battery packs 10 inserted in the rechargeable battery holes 31, and information about the number of charged battery packs 10. Communication between the rechargeable battery number acquisition component 51 and the information transmitter 33 of the charging device 30 may be wireless or by wire, and may be via the Internet or the like.

The rechargeable battery hole number recorder 52 records in advance the number of rechargeable battery holes 31 provided to the charging device 30. The number of rechargeable battery holes 31 is predetermined by design.

The reservation number acquisition component 53 acquires the number of reservations transmitted from the information transmitter 43 of the information terminal 40. The return number acquisition component 54 acquires the number of returns transmitted from the information transmitter 43 of the information terminal 40. Communication between the information transmitter 43, the reservation number acquisition component 53, and the return number acquisition component 54 is performed wirelessly. Communication via the Internet or the like is also possible.

The reservation possibility determination component 55 determines whether or not a reservation can be made from the information terminal 40 on the basis of the number of charged battery packs 10 acquired by the rechargeable battery number acquisition component 51, the number of rechargeable battery holes 31 recorded by the rechargeable battery hole number recorder 52, the number of reservations acquired by the reservation number acquisition component 53, and the number of returns acquired by the return number acquisition component 54. The determination of whether or not reservation is possible will be described in detail below.

2. Operation

Next, the operation of the reservation management device 50 in this embodiment will be described, and an example of the reservation management method of the present invention will be discussed at the same time.

First, when the user inputs the number of reservations in the reservation number input field 45 of the information terminal 40, inputs the number of returns in the return number input field 46, and presses the reserve button 47, the inputted number of reservations and number of returns are transmitted from the information transmitter 43 to the reservation management device 50.

The reservation number acquisition component 53 of the reservation management device 50 then acquires the number of reservations inputted by the user (step S10). Step S10 corresponds to an example of a reservation number acquisition step.

Next, the return number acquisition component 54 obtains the number of returns inputted by the user (step S11). Step S11 corresponds to an example of a return number acquisition step.

Next, the reservation possibility determination component 55 calculates the number of empty rechargeable battery holes 31 (step S12). More specifically, the rechargeable battery number acquisition component 51 acquires the number of battery packs 10 disposed in the rechargeable battery holes 31. Put another way, the rechargeable battery number acquisition component 51 can be said to acquire the number of rechargeable battery holes 31 in which battery packs 10 are disposed. The reservation possibility determination component 55 calculates the number of empty rechargeable battery holes 31 by subtracting the number of filled rechargeable battery holes 31 from the number of rechargeable battery holes recorded in the rechargeable battery hole number recorder 52.

Next, the rechargeable battery number acquisition component 51 acquires the number of charged battery packs 10 (step S13). More precisely, in the charging device 30, the charging information sensor 32 senses charging information about the battery packs 10 inserted in the rechargeable battery holes 31, and senses whether or not each of the battery packs 10 has been charged. Here, "charged" may be a state in which a battery pack 10 is fully charged, or a specific threshold value may be set, and a battery pack may be considered charged if its charge is at or over this threshold. The charged battery packs 10 acquired in step S13 are battery packs 10 that have not been reserved from another information terminal 40.

Next, the reservation possibility determination component 55 determines whether or not the number of empty rechargeable battery holes 31 is greater than or equal to the number of returns (step S14).

If the number of empty rechargeable battery holes 31 is greater than or equal to the number of returns, the reservation possibility determination component 55 determines that return is possible, and then determines whether or not the number of charged battery packs 10 is greater than or equal to the number of reservations (step S15). If the number of charged battery packs 10 is greater than or equal to the number of reservations, the reservation possibility determination component 55 determines that battery packs 10 can be reserved in the inputted number of reservations.

That is, in steps S14 and S15, the reservation possibility determination component 55 determines whether or not reservation is possible. Steps S14 and S15 correspond to an example of a reservation possibility determination step.

The reservation possibility determination component 55 completes the reservation processing and transmits a notification of reservation completion to the information terminal 40, and the display component 44 displays this reservation completion to inform the user (step S16). In step S16, the reservation possibility determination component 55 also sends the charging device 30 a message to the effect that a reservation has been completed, and furthermore transmits the number of battery packs 10 to be returned and to be reserved in this reservation.

The rechargeable battery extraction controller 34 of the charging device 30 controls extraction of the battery packs 10 based on the number of returns and the number of reservations. More specifically, as described above, control is performed so that the reserved number of battery packs 10 can be taken out only after all of the battery packs 10 to be returned have been inserted into the rechargeable battery holes 31.

If the number of empty rechargeable battery holes 31 is less than the number of returns (step S14), and if the number of charged battery packs 10 is less than the number of reservations (step S15), the reservation possibility determination component 55 determines that a reservation cannot be made, and a notification that the reservation cannot be made is transmitted to the information terminal 40 (step S17). The display component 44 of the information terminal 40 displays a message to the effect that the reservation cannot be made, thereby advising the user of this fact.

3. Features, Etc (3-1)

The reservation management device 50 in this embodiment is a reservation management device that manages reservations for the exchange of the battery packs 10 in the charging device 30 capable of charging a plurality of battery packs 10, and comprises the reservation number acquisition component 53, the return number acquisition component 54, and the reservation possibility determination component 55. The reservation number acquisition component 53 acquires the number of battery packs 10 to be reserved in the charging device 30. The return number acquisition component 54 acquires the number of battery packs 10 to be returned to the charging device 30. The reservation possibility determination component 55 determines whether or not the exchange of the battery packs 10 in the charging device 30 can be reserved, on the basis of the number of reservations acquired by the reservation number acquisition component 53 and the number of returns obtained by the return number acquisition component 54.

Thus, reservations can be managed in consideration of the number of batteries to be returned, by determining whether or not a reservation is possible on the basis of the number returned to the charging device 30 and the number to be reserved.

This prevents a situation in which the user shows up at the charging device 30 but cannot return the battery packs 10 or cannot pick up the reserved number.

(3-2)

In this embodiment, the charging device 30 is provided with a plurality of rechargeable battery holes 31 in which the battery packs 10 are disposed. With the reservation management device 50 in this embodiment, the reservation possibility determination component 55 determines whether or not the exchange of battery packs 10 can be reserved on the basis of the number of empty rechargeable battery holes 31, in addition to the number of reservations and the number of returns.

Thus, when there are rechargeable battery holes 31 in which the individual battery packs 10 are disposed, whether or not the return number can be returned to the charging device 30 is determined by taking into account the number of empty rechargeable battery holes 31.

(3-3)

With the reservation management device 50 in this embodiment, the reservation possibility determination component 55 determines whether or not the return number can be returned to the charging device 30 on the basis of the number of empty rechargeable battery holes 31, in addition to the number of reservations and the number of returns, and determines that a reservation is possible when a return is possible.

Thus allowing a reservation to be made when a return is possible allows the battery packs 10 to be reliably returned to the rechargeable battery holes 31 upon arrival at the charging device 30, and prevents a situation in which the battery packs 10 cannot be returned.

(3-4)

The reservation management device 50 in this embodiment further comprises a rechargeable battery number acquisition component 51. The rechargeable battery number acquisition component 51 acquires the number of charged battery packs 10 in the charging device 30. The reservation possibility determination component 55 determines whether or not reservation is possible on the basis of the number of charged battery packs 10, the number of reservations, the number of returns, and the number of empty battery disposition components.

Thus comparing the number of charged battery packs 10 with the number of reservations allows a user to make a reservation when the number of charged battery packs 10 is greater than or equal to the number of reservations, for example. This reliably allows a user to pick up the charged battery packs 10 upon arrival at the charging device 30, and prevents a situation in which the battery packs 10 cannot be picked up.

(3-5)

With the reservation management device 50 in this embodiment, the rechargeable battery number acquisition component 51 acquires the number of charged batteries by sensing the battery packs 10 whose charge is greater than or equal to a specific amount, and counting the number of those battery packs 10.

This allows the user to acquire batteries with a charge that is greater than or equal to a specific amount, in the number reserved at the charging device.

(3-6)

With the reservation management device 50 in this embodiment, the rechargeable battery number acquisition component 51 acquires the number of charged batteries by sensing the fully charged battery packs 10, and counting the number of those battery packs 10.

This allows the user to acquire fully charged batteries in the number reserved at the charging device.

(3-7)

With the reservation management device 50 in this embodiment, the reservation possibility determination component 55 determines that the return is possible if the number of empty rechargeable battery holes 31 is greater than or equal to the number of returns.

Consequently, when it is determined that reservation is possible, the battery packs 10 can be returned to the charging device 30 in the number scheduled to be returned at the time of arrival at the charging device 30.

For example, if charged battery packs 10 cannot be taken out of the rechargeable battery holes 31 unless all of the battery packs 10 to be returned to the charging device 30 have been disposed in the rechargeable battery holes 31, then the number of rechargeable battery holes 31 must be greater than or equal to the number of returns. In such a case, when it is determined that reservation is possible, the battery packs 10 can be reliably returned to the charging device 30 in the number scheduled to be returned upon arrival at the charging device.

(3-8)

With the reservation management device 50 in this embodiment, a plurality of battery packs 10 can be installed in and removed from the vehicle 20, and the plurality of battery packs 10 are connected in parallel in the state of being installed in the vehicle 20.

Because of this configuration in which battery packs 10 that can be installed in the vehicle 20 can be connected in parallel, the user can install the battery packs 10 in the vehicle 20 in a number corresponding to the distance to be traveled. That is, fewer batteries may be installed when the scheduled travel distance is short, and a smaller number of installed batteries means that the weight is lighter and the travel distance for a given amount of power amount can be extended. In this case, the number of battery packs 10 returned may be greater than the number of reservations, but with this embodiment, even when the number of returns is large, this can be taken into account in determining whether reservations are possible.

Here, a vehicle such as an electric motorcycle, an electric bicycle, or an electrically assisted bicycle is used as the vehicle 20.

Consequently, the exchange of battery packs 10 can be reserved in order to exchange the battery packs 10 installed in the vehicle 20 at the charging device 30.

(3-9)

The reservation management system 1 in this embodiment is a reservation management system that manages reservations for the exchange of battery packs 10 at a charging device 30 that is capable of charging a plurality of battery packs 10, and comprises the reservation number acquisition component 53, the return number acquisition component 54, the reservation possibility determination component 55, the reservation number input component 41, the return number input component 42, the information transmitter 43, and the display component 44. The reservation number acquisition component 53 acquires the number of battery packs 10 to be reserved in the charging device 30. The return number acquisition component 54 acquires the number of battery packs 10 to be returned to the charging device 30. The reservation possibility determination component 55 determines whether or not the exchange of the battery packs 10 in the charging device 30 can be reserved, on the basis of the number of reservations acquired by the reservation number acquisition component 53 and the number of returns obtained by the return number acquisition component 54. The reservation number input component 41 inputs the number of reservations. The return number input component 42 inputs the number of returns. The information transmitter 43 transmits the inputted number of reservations to the reservation number acquisition component 53, and transmits the inputted number of returns to the return number acquisition component 54. The display component 44 displays information related to whether or not reservation is possible as determined by the reservation possibility determination component 55.

Consequently, when the user inputs the number of reservations and the number of returns from the information terminal 40, the possibility of making a reservation is determined on the basis of this input, and the user can confirm whether or not a reservation can be made to exchange the battery packs 10 at the charging device 30.

(3-10)

With the reservation management device 50 in this embodiment, when it is determined by the reservation possibility determination component 55 that a reservation to exchange the battery packs 10 at a specific charging device 30 cannot be made, the display component 44 displays a message to the effect that a reservation to exchange the battery packs 10 at that specific charging device 30 cannot be made.

Consequently, the user can recognize that a reservation to exchange the battery packs 10 cannot be made at that specific charging device 30.

(3-11)

The reservation management method in this embodiment is a reservation management method for managing reservations for battery exchange at a charging device capable of charging a plurality of batteries, said method comprising a step S10, a step S11, and steps S14 and S15. In step S10, the number of battery packs 10 to be reserved at the charging device 30 is acquired. In step S11, the number of battery packs 10 to be returned to the charging device 30 is acquired.

In steps S14 and S15, whether or not the exchange of the battery packs 10 at the charging device 30 is possible is determined on the basis of the number of reservations acquired in step S10 and the number of returns acquired in step S11.

Thus, reservations can be managed in consideration of the number of battery packs 10 to be returned, by determining whether or not reservation is possible on the basis of the number to be returned to the charging device 30 and the number to be reserved.

That is, it is possible to prevent a situation in which the battery packs 10 cannot be returned or the user cannot pick up the reserved number even though the user has arrived at the charging device 30.

4. Other Embodiments

An embodiment of the present invention was described above, but the present invention is not limited to or by the above embodiment, and various modifications are possible without departing from the gist of the invention.

(A)

In the above embodiment, control was performed at the charging device 30 so that the reserved number of battery packs 10 could be taken out only after all of the inputted return number of battery packs 10 had been inserted into the rechargeable battery holes 31, but control such as this is not the only option.

For example, control may be performed so that one battery pack 10 can be taken out when one battery pack 10 has been inserted into a rechargeable battery hole 31. The operation of the reservation management device 50 in this case is shown in FIG. 5. The operation flow shown in FIG. 5 differs from the operation shown in FIG. 4 in the determination in step S14. In the operation flow shown in FIG. 5, in step S14', the reservation possibility determination component 55 determines whether or not the number of empty rechargeable battery holes 31 is greater than the remainder obtained by subtracting the number of reservations from the number of returns. If this remainder is greater, the reservation possibility determination component 55 determines that it is possible to insert the inputted return number into the charging device 30, and control proceeds to step S15. On the other hand, if the number of empty rechargeable battery holes 31 is less than or equal to the remainder obtained by subtracting the number of reservations from the number of returns, the reservation possibility determination component 55 determines the inputted return number cannot be returned to the charging device, and controls moves to S17.

For example, if the number of returns is four and the number of reservations is three, when a first battery pack 10 is returned, a first battery pack 10 can be taken out, when a second battery pack 10 is then returned, a second battery pack 10 can be taken out, and when a third battery pack 10 is returned, a third battery pack 10 can be taken out. The remaining fourth battery pack 10 is then returned.

Also, if the number of returns is three and the number of reservations is four, for example, when a first battery pack 10 is returned, a first battery pack 10 can be taken out, when a second battery pack 10 is returned, a second battery pack 10 can be taken out, and when a third battery pack 10 is returned, third and fourth battery packs 10 can be taken out. Thus, when the number of returns is less than the number of reservations, all of the battery packs 10 can be taken out once all the returns are in place.

That is, if the number of returns is two and the number of reservations is four, one battery pack 10 can be taken out when one battery pack 10 is returned, and then second, third, and fourth battery packs 10 can be taken out when a second battery pack 10 is returned.

The reservation possibility determination component 55 may also determine that a reservation cannot be made if the number of empty rechargeable battery holes 31 is equal to the remainder obtained by subtracting the number of reservations from the number of returns. The reason for this is that the numbers are the same, all of the rechargeable battery holes 31 will be filled by battery packs 10 when the user exchanges the battery packs 10, and there will be no empty rechargeable battery hole 31 for the next user to return a battery pack 10. That is, it is preferable for the control of the reservation management device 50 to be performed so that there is at least one empty rechargeable battery hole 31.

Also, control may be performed so that if the number of empty rechargeable battery holes 31 is the same as the remainder obtained by subtracting the number of reservations from the number of returns, it is not determined that a reservation cannot be made, the removal of one battery pack 10 is first enabled, and once the user has taken out a battery pack 10, the removal of one battery pack 10 is enabled when a battery pack 10 has inserted into a rechargeable battery hole 31.

(B)

In the above embodiment, when it was determined by the reservation possibility determination component 55 that reservation could not be performed, a message indicating that reservation is impossible was displayed on the display component 44, but the number of battery packs that can be returned to the charging device 30 and the number of reservations may be displayed on the display component 44.

Consequently, the user can make a reservation if it is determined that there is no problem with the presented number of returns or the number of reservations.

(C)

In the above embodiment, when it was determined by the reservation possibility determination component 55 that a reservation could not be made, a message indicating that a reservation could not be made was displayed on the display component 44, but the waiting time until the inputted number of returns or number of reservations becomes possible may be displayed on the display component 44.

Figure 6:
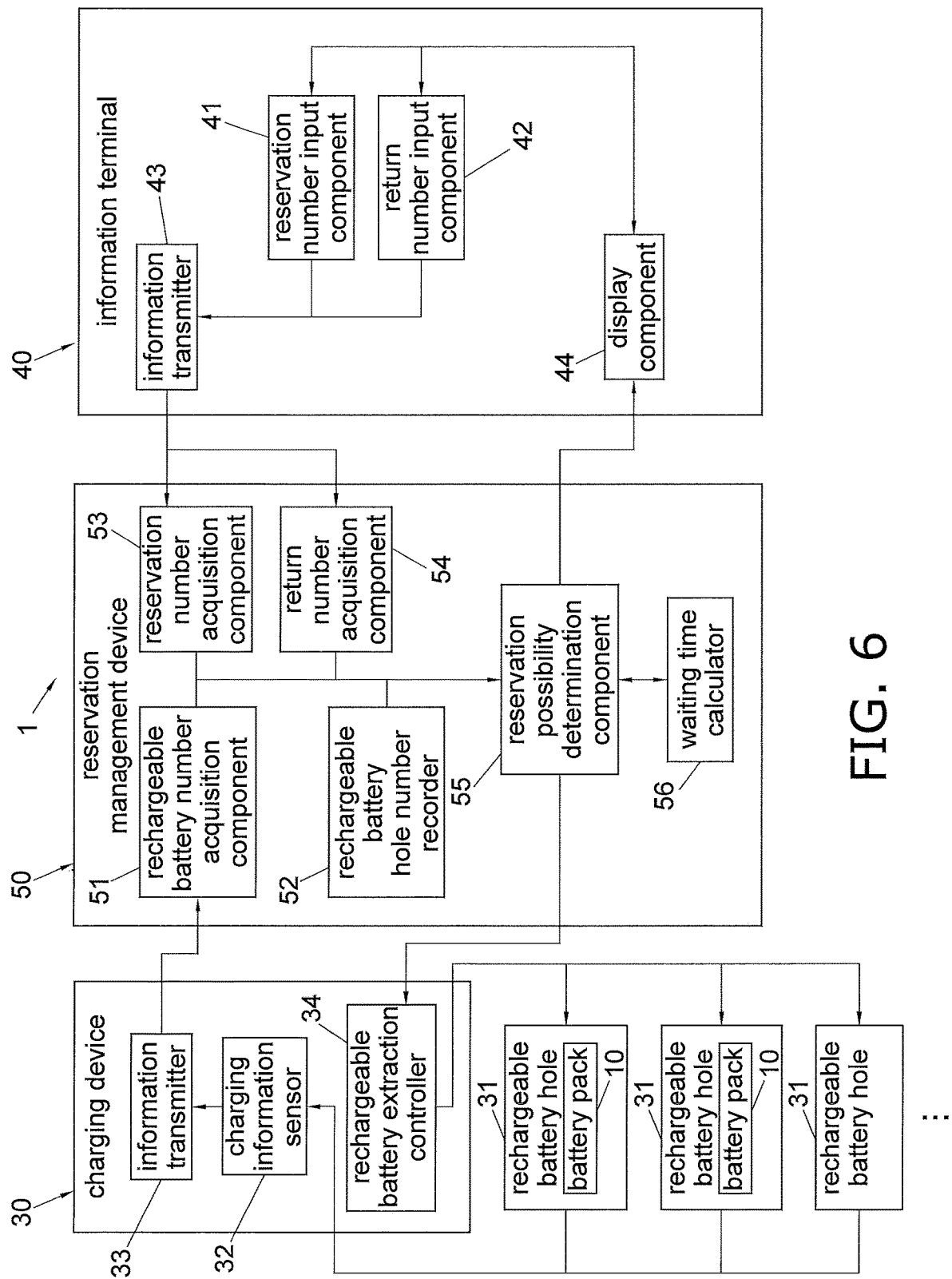
FIG. 6 is a block diagram showing the configuration of the reservation management system in a modification example of an embodiment pertaining to the present invention.

FIG. 6 is a block diagram showing the configuration of the reservation management device 50 that causes the display component 44 to display the waiting time. The reservation management device 50 shown in FIG. 6 further comprises a waiting time calculator 56. The waiting time calculator 56 calculates the waiting time until the inputted number of returns or number of reservations will be possible, on the basis of the information related to the charging of the battery packs 10 acquired by the rechargeable battery number acquisition component 51, the number of returns, the number of reservations, and so forth. The display component 44 displays the calculated waiting time.

Calculation of the time until the number of reservations becomes possible involves calculating how long it takes until the reserved number of batteries reach full charge or a specific charge, from the speed at which the battery packs 10 are charged. Also, how long it will take until the number of returns will become possible can be found by calculating how long the rechargeable battery holes 31 corresponding to the number of returns to the charging device 30 are empty (for example, the reservation time of other users, or the arrival time from the current location of other users).

Consequently, when the user cannot return or reserve the desired number of battery packs, it is possible to present the user with the length of time until the desired number of returns or reservations will be possible. Therefore, the user can determine whether or not to head toward the charging device 30 after confirming the presented waiting time.

(D)

In the above embodiment, in step S13 the number of charged batteries at the time of reservation was acquired, but if the arrival time at the charging device 30 is known in advance from location information about the vehicle 20, the number of charged batteries at the arrival time may be acquired from the arrival time and the charging speed.

Figure 7:
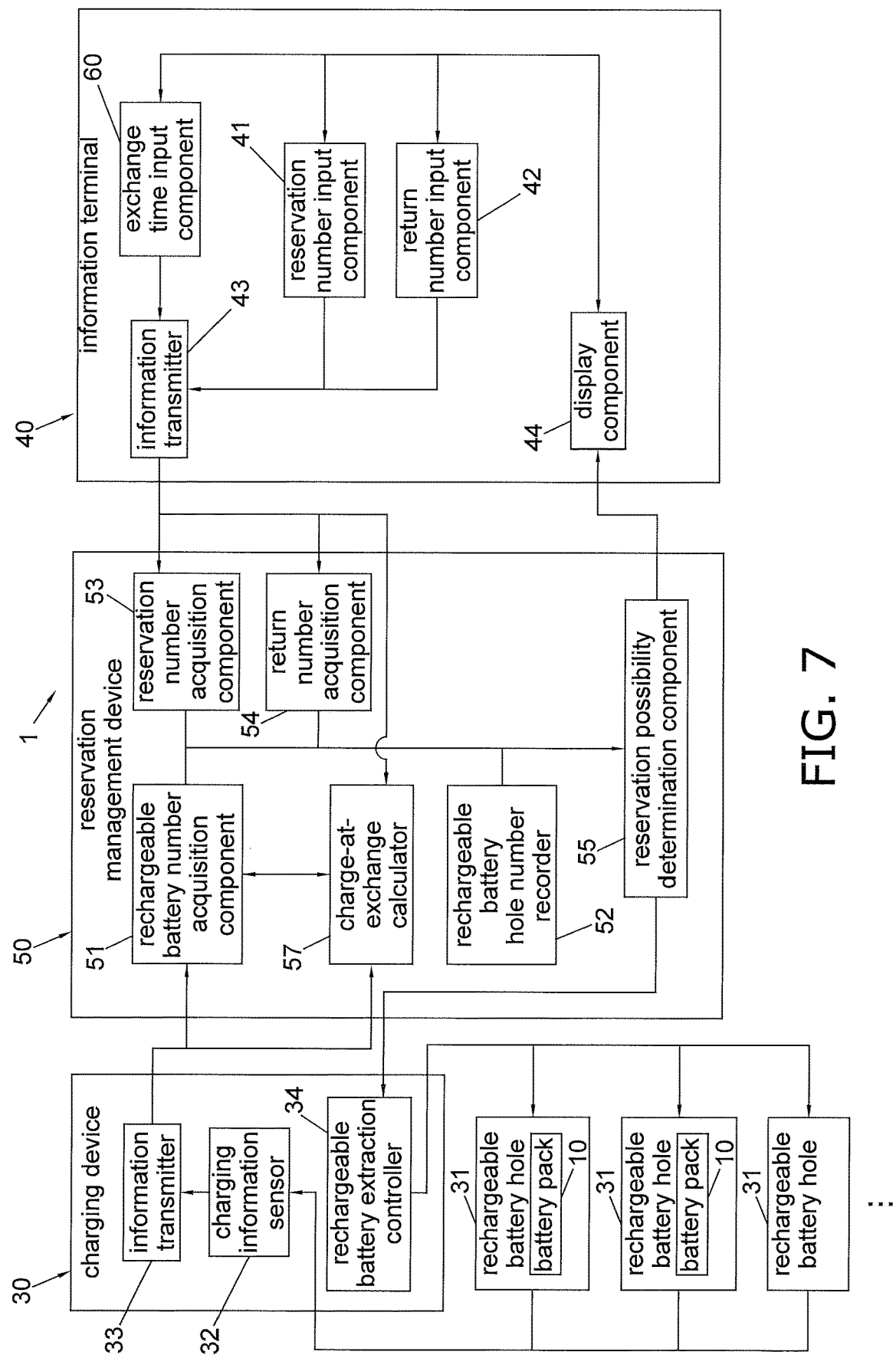
FIG. 7 is a block diagram showing the configuration of the reservation management system in a modification example of an embodiment pertaining to the present invention.

FIG. 7 is a block diagram showing the configuration of the reservation management device 50 comprising a charge-at-exchange calculator 57. Also, as shown in FIG. 7, the information terminal 40 is provided with an exchange time input component 60. The exchange time input component 60 inputs the clock time at which the user of the information terminal 40 arrives at the charging device 30. The input of this time is performed on the screen of the display component 44, which is constituted by a touch panel or the like. The inputted scheduled exchange time is transmitted to the charge-at-exchange calculator 57 via the information transmitter 43. The charge-at-exchange calculator 57 calculates the charge of the battery packs 10 in the charging device 30 at the scheduled exchange time from the information related to the charging of the battery pack 10 received from the information transmitter 33 and the scheduled exchange time. The rechargeable battery number acquisition component 51 acquires the number of battery packs 10 in which the charge calculated by the charge-at-exchange calculator 57 has reached a full charge or a specific charge amount. Consequently, the number of battery packs 10 that can be supplied when the user arrives at the charging device 30 can be calculated.

The reservation possibility determination component 55 determines whether or not a reservation is possible on the basis of the number of the battery packs 10.

In addition to having the user input the scheduled exchange time to the exchange time input component 60, the information terminal 40 may have a GPS function, for example, and the time (scheduled exchange time) at which the user arrives at the charging device 30 may be calculated from the distance between the current location of the information terminal 40 and the charging device 30.

(E)

In the above embodiment, the reservation management device 50 performed reservation management of one charging device 30, but may also perform management of reservations for a plurality of charging devices 30. The charging devices 30 are disposed at a plurality of places like gas stations. The reservation management device 50 may manage the charging device 30 at each location.

Figure 8:
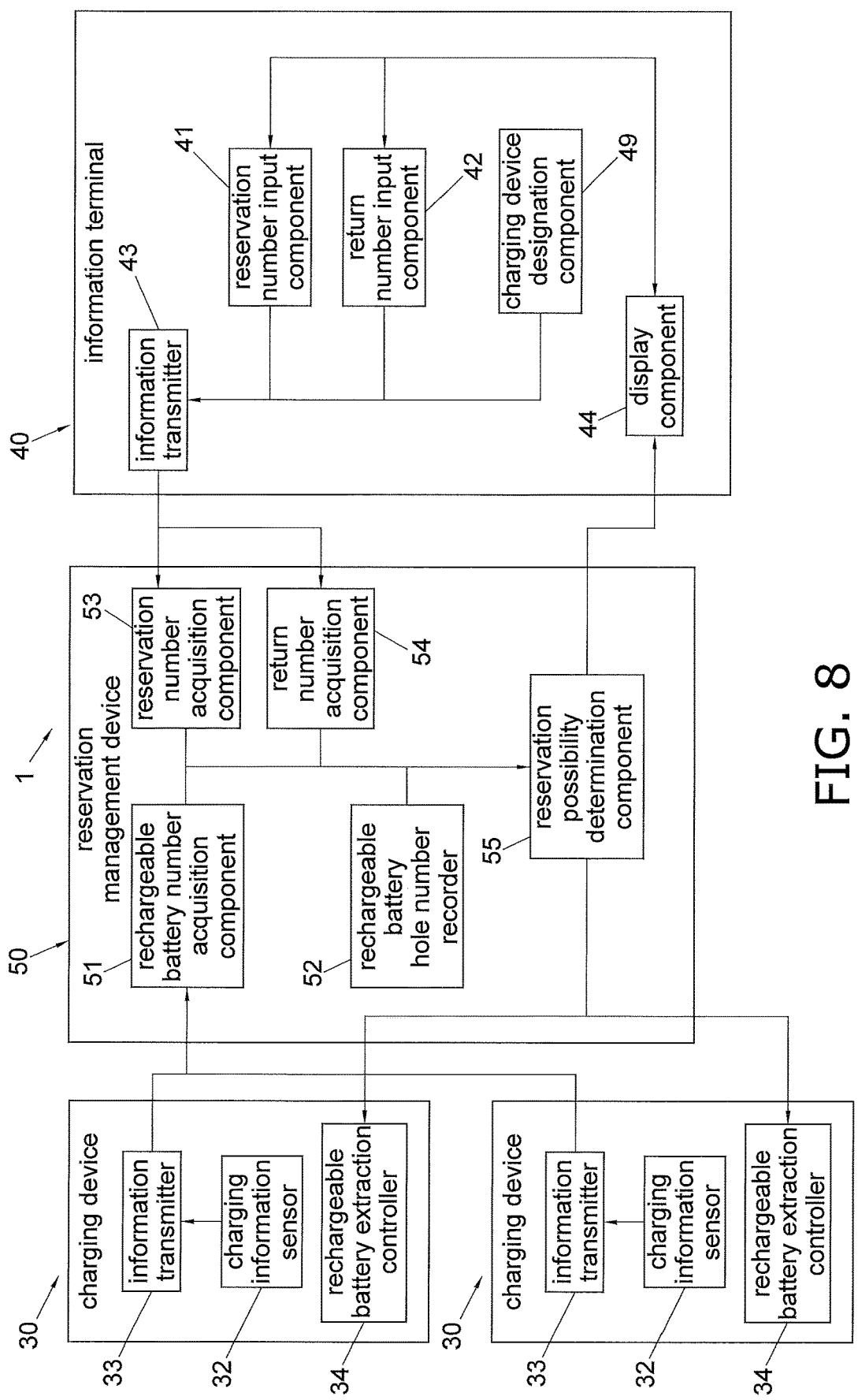
FIG. 8 is a block diagram showing the configuration of the reservation management system in a modification example of an embodiment pertaining to the present invention.

FIG. 8 is a block diagram showing the configuration when a plurality of charging devices 30 are managed. The rechargeable battery holes 31 are not depicted in FIG. 8. As shown in FIG. 8, the rechargeable battery number acquisition component 51 acquires information related to charging of the battery packs 10 by the plurality of charging devices 30. The reservation possibility determination component 55 transmits information such as a message indicating that a reservation has been made, the number of returns, and the number of reservations to a reserved charging device 30. The rechargeable battery hole number recorder 52 records the number of rechargeable battery holes 31 of all the charging devices 30.

Also, the information terminal 40 is provided with a charging device designation component 49 for designating a charging device 30.

Figure 4:
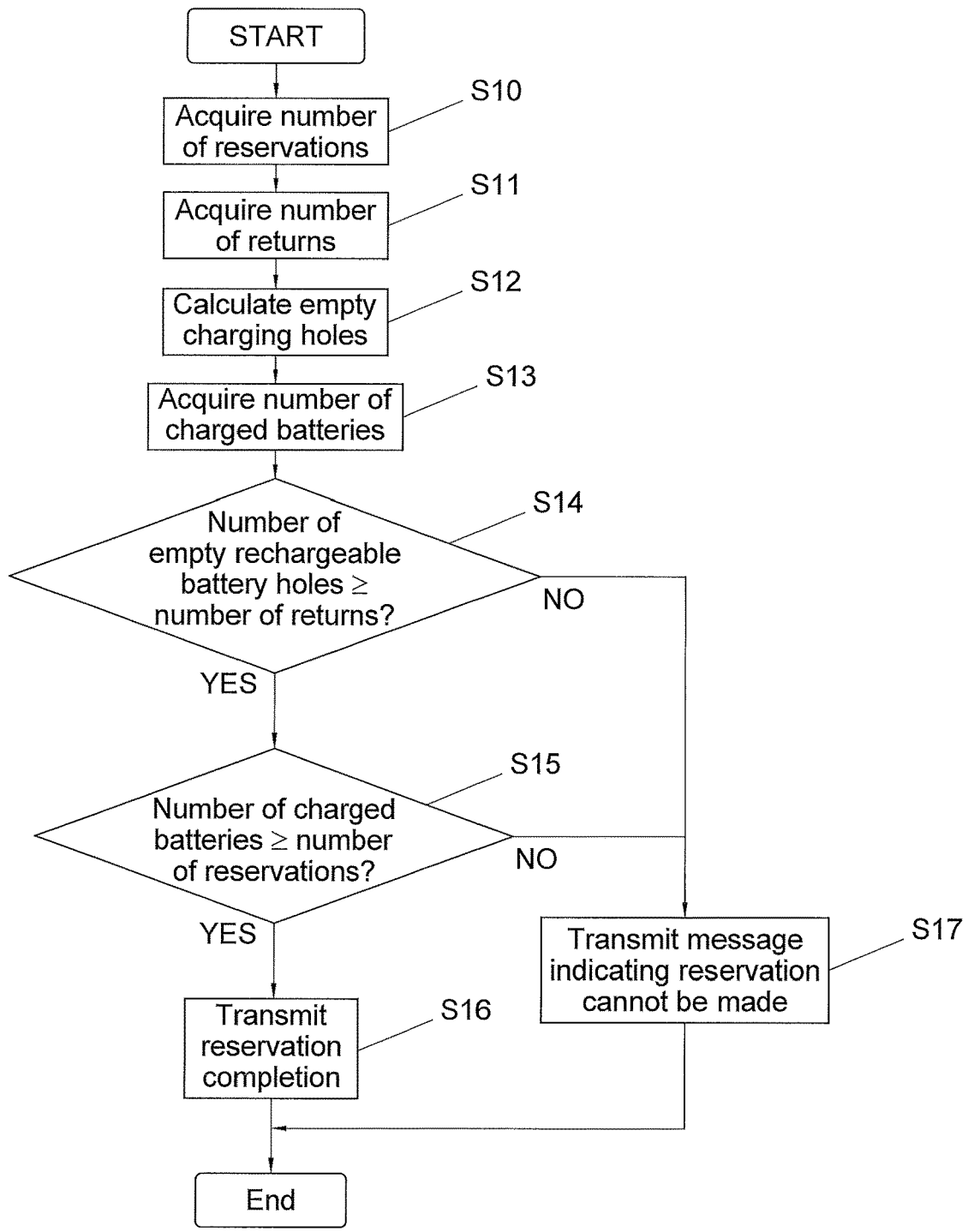
FIG. 4 is a flowchart of the operation of the reservation management device in FIG. 2.
Figure 5:
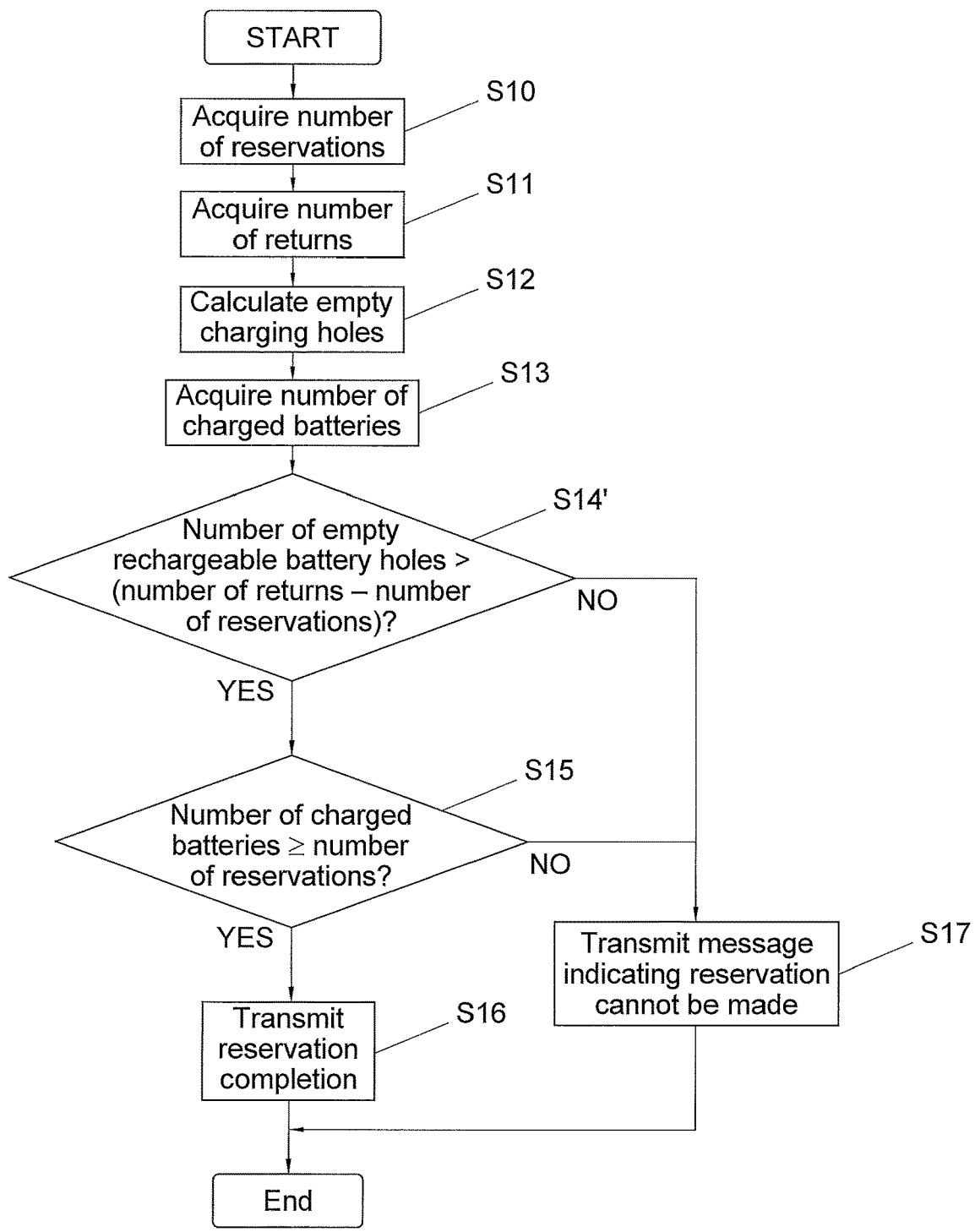
FIG. 5 is a flowchart of the operation of the reservation management device in a modification example of an embodiment pertaining to the present invention.

When the user operates the information terminal 40 to designate a charging device 30 and input the number of reservations and the number of returns, the reservation management device 50 determines whether or not a reservation is possible at the designated charging device 30 on the basis of the operation flow shown in FIG. 4. If it is determined that a reservation is possible, the reservation possibility determination component 55 transmits a message to the information terminal 40 indicating that a reservation has been made, and transmits reservation completion information, information about the number of reservations, and information about the number of returns to the designated charging device 30.

On the other hand, if it is determined that a reservation cannot be made, the reservation possibility determination component 55 searches for a charge device 30 that can be reserved on the basis of the inputted number of returns and number of reservations, and if there is a charge device 30 that can be reserved, the fact that there is another charging device 30 that can be reserved, and information related to that charging device 30 are transmitted to the information terminal 40. This information related to the charging device 30 may include navigation to the charging device 30. Then, when the user accepts this charging device 30, the reservation management device 50 transmits reservation completion information and information about the number of reservations and the number of returns to this charging device 30. Navigation may be displayed on the display component 44 if approved by the user.

(F)

In the above embodiment, the user inputted the number of reservations, but another device installed in the information terminal 40 or the vehicle 20 may automatically calculate the number of reservations instead. For example, if the scheduled travel distance is inputted by the user without directly inputting the number of reservations, the required number of reservations is automatically calculated from the present remaining capacity of the battery packs 10 installed in the vehicle 20, and the calculated number of reservations is transmitted to the reservation management device 50. This transmission may be performed automatically or may be performed after an operation is performed by the user.

(G)

In the above embodiment, the user inputted the number of returns, but another device installed in the information terminal 40 or the vehicle 20 may automatically calculate the number of returns instead. For example, the number of returns is automatically calculated from the present remaining capacity of the battery packs 10 installed in the vehicle 20, and the calculated number of returns is transmitted to the reservation management device 50. This transmission may be performed automatically or may be performed after an operation is performed by the user.

(H)

In the above embodiment, the rechargeable battery number acquisition component 51 accepted two kinds of information, namely, information about the number of rechargeable battery holes 31 filled by battery packs 10 and information about the number of charged battery packs 10, as information related to the charging of the battery packs 10, but these types of information may be acquired separately. For example, the rechargeable battery number acquisition component 51 may acquire the number of rechargeable battery holes 31 filled with battery packs 10, a charged number acquisition component may be provided separately, and this charged number acquisition component may acquire the number of charged battery packs 10.

(I)

In the above embodiment, step S15 was performed after step S14, but step S15 may instead be performed before step S14.

(J)

In the above embodiment, four of the battery packs 10 were provided, but the number is not limited to four, and may be less than four or greater than four.

(K)

In the above embodiment, an electric motorcycle was used as the moving body, for example, but another vehicle such as an electric bicycle, an electric unicycle, an electric automobile (EV), or a PHV (plug-in hybrid vehicle) may be used instead.

INDUSTRIAL APPLICABILITY

The reservation management device, reservation management system, and reservation management method of the present invention can be widely applied to reservation management devices, etc., that can manage reservations by taking into account the number of batteries to be returned, and that are used in the use of vehicles driven by exchangeable batteries.

REFERENCE SIGNS LIST

1: reservation management system
10: battery pack
20: vehicle (an example of a power consumption element, an example of a moving body)
20a: seat
20 b: handle bar
21: motor
22: rear wheel
23: front wheel
30: charging device
31: rechargeable battery hole (an example of a battery disposition component)
32: charging information sensor
33: information transmitter
34: rechargeable battery extraction controller
40: information terminal
41: reservation number input component
42: return number input component
43: information transmitter
44: display component
45: reservation number input field
46: return number input field
47: reserve button
48: cancel button
49: charging device designation component
50: reservation management device
51: rechargeable battery number acquisition component (an example of a charged battery number acquisition component)
52: rechargeable battery hole number recorder
53: reservation number acquisition component
54: return number acquisition component
55: reservation possibility determination component

The invention claimed is:

1. A reservation management device configured to manage reservations for exchange of batteries in a charging device configured to charge a plurality of batteries, the reservation management device comprising a processor configured to perform operations comprising operation as:
- a reservation number acquisition component that acquires a number of batteries to be reserved at the charging device;
- a return number acquisition component that acquires a number of batteries to be returned to the charging device; and
- a reservation possibility determination component that determines whether or not it is possible to reserve the exchange of the batteries at the charging device based on a number of reservations acquired by the reservation number acquisition component and a number of returns acquired by the returned number acquisition component, wherein
- the charging device comprises a plurality of battery disposition components in which the batteries are capable of being disposed, and
- the processor configured to perform operations such that operation as the reservation possibility determination component comprises operation as the reservation possibility determination component that determines that it is possible to reserve the exchange of the batteries by:
  - determining whether or not a number of empty battery disposition components is greater than or equal to the number of returns;
  - in response determining that the number of empty battery disposition components is greater than or equal to the number of returns, determining whether or not the number of charged battery packs is greater than or equal to the number of reservations; and
  - in response to determining that the number of charged battery packs is greater than or equal to the number of reservations, determining that the number of reservations can be reserved.

2. The reservation management device according to claim 1, wherein
the processor is configured to perform operations further comprising operation as a charged battery number acquisition component that acquires the number of charged batteries in the charging device, and
the processor is configured to perform operations such that such that operation as the reservation possibility determination component comprises operation as the reservation possibility determination component that determines whether or not reservation is possible based on a number of charged batteries, the number of reservations, the number of returns, and the number of empty battery disposition components.

3. The reservation management device according to claim 2, wherein the processor is configured to perform operations such that such that operation as the charged battery number acquisition component comprises operation as the charged battery number acquisition component that acquires the number of charged batteries by sensing batteries whose charge is greater than or equal to a specific amount, and counting the number of said batteries.

4. The reservation management device according to claim 2, wherein the processor is configured to perform operations such that such that operation as the charged battery number acquisition component comprises operation as the charged battery number acquisition component that acquires the number of charged batteries by sensing batteries that are fully charged, and counting the number of said batteries.

5. The reservation management device according to claim 2, wherein the processor is configured to perform operations further comprising operation as a charge-at-exchange calculator that calculates a charge of the batteries in the charging device at a scheduled exchange time,
such that such that operation as the charged battery number acquisition component comprises operation as the charged battery number acquisition component that acquires the number of charged batteries by sensing the batteries whose charge at the scheduled exchange time is greater than or equal to a specific amount, and counting the number of said batteries.

6. The reservation management device according to claim 1,
wherein the batteries are configured to be removably installed in a power consumption element, and
the power consumption element comprises an electric motorcycle, an electric bicycle, an electrically assisted bicycle, or an electric power tool.

7. The reservation management device according to claim 1,
wherein the battery is configured to be removably installed in a moving body, and
a plurality of the batteries are connected in parallel in a state of being installed in the moving body.

8. A reservation management system configured to manage reservations for exchange of batteries in a charging device configured to charge a plurality of batteries, the reservation management system comprising:
a reservation management device comprising a processor configured to perform operations comprising operation as
- a reservation number acquisition component that acquires a number of batteries to be reserved at the charging device;
- a return number acquisition component that acquires a number of batteries to be returned to the charging device; and
- a reservation possibility determination component that determines whether or not it is possible to reserve the exchange of the batteries at the charging device based on a number of reservations acquired by the reservation number acquisition component and a number of returns acquired by the returned number acquisition component; and
an information terminal comprising a processor configured to perform operations comprising operation as
- a reservation number input component for inputting the number of reservations;
- a return number input component for inputting the number of returns;
- an information transmitter that transmits the inputted number of reservations to the reservation number acquisition component and transmits the inputted number of returns to the return number acquisition component; and
- a display component that displays information related to reservation possibility determined by the reservation possibility determination component, wherein
the charging device comprises a plurality of battery disposition components in which the batteries are disposed, and
the processor of the reservation management device is configured to perform operations such that operation as the reservation possibility determination component comprises operation as the reservation possibility determination component that determines that it is possible to reserve the exchange of the batteries by:
  determining whether or not a number of empty battery disposition components is greater than or equal to the number of returns;
  in response determining that the number of empty battery disposition components is greater than or equal to the number of returns, determining whether or not the number of charged battery packs is greater than or equal to the number of reservations; and
  in response to determining that the number of charged battery packs is greater than or equal to the number of reservations, determining that the number of reservations can be reserved.

9. The reservation management system according to claim 8,
  wherein, the processor of the reservation management device is configured to perform operations such that when it is determined by the reservation possibility determination component that the exchange of batteries at a specific charging device cannot be reserved, the display component displays a message indicating that the exchange of batteries cannot be reserved at the specific charging device.

10. The reservation management system according to claim 8,
  further comprising a plurality of the charging devices,
  the reservation management system manages reservations for the exchange of batteries at the plurality of charging devices, and
  wherein, the processor of the reservation management device is configured to perform operations such that when it is determined by the reservation possibility determination component that the exchange of batteries at a specific charging device cannot be reserved, information related to other charging devices that can be reserved is displayed on the display component.

11. The reservation management system according to claim 8, wherein
  the processor of the reservation management device is configured to perform operations further comprising operation as a charged battery number acquisition component that acquires a number of charged batteries in the charging device,
  the charging device is provided with a plurality of battery disposition components for disposing the batteries,
  the processor of the reservation management device is configured to perform operations such that operation as the reservation possibility determination component comprises operation as the reservation possibility determination component that determines whether or not it is possible to reserve the exchange of the batteries on the basis of the number of charged batteries, the number of reservations, the number of returns, and the number of empty battery disposition components, and
  the display component displays a number of batteries that can be returned or a number of batteries that can be reserved at a specific charging device when it is determined that battery exchange cannot be reserved at the specific charging device.

12. The reservation management system according to claim 8, wherein
  the processor of the reservation management device is configured to perform operations further comprising a waiting time calculator that calculates a waiting time at a specific charging device when it is determined by the reservation possibility determination component that it is impossible to reserve the exchange of the batteries at the specific charging device,
  the display component displays the waiting time at the specific charging device.

13. A reservation management method for managing reservations for exchange of batteries at a charging device configured to charge a plurality of batteries, the reservation management method comprising:
  a reservation number acquisition step of acquiring a number of batteries to be reserved in the charging device;
  a return number acquisition step of acquiring a number of the batteries to be returned to the charging device; and
  a reservation possibility determination step of determining whether or not it is possible to reserve the exchange of the batteries at the charging device based on a number of reservations acquired in the reservation number acquisition step and a number of returns acquired in the return number acquisition step, wherein
  the charging device comprises a plurality of battery disposition components in which the batteries are disposed, and
  the reservation possibility determination step determines that it is possible to reserve the exchange of the batteries by:
    determining whether or not a number of empty battery disposition components is greater than or equal to the number of returns;
    in response determining that the number of empty battery disposition components is greater than or equal to the number of returns, determining whether or not the number of charged battery packs is greater than or equal to the number of reservations; and
    in response to determining that the number of charged battery packs is greater than or equal to the number of reservations, determining that the number of reservations can be reserved.

* * * * *